United States Patent
Chae (10) Patent No.: US 12,549,080 B2
(45) Date of Patent: Feb. 10, 2026

(54) DUAL ROTOR MOTOR

(71) Applicants: HYUNDAI MOTOR COMPANY, Seoul (KR); KIA CORPORATION, Seoul (KR)

(72) Inventor: Min Ho Chae, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 186 days.

(21) Appl. No.: 18/507,513

(22) Filed: Nov. 13, 2023

(65) Prior Publication Data

US 2025/0007372 A1    Jan. 2, 2025

(30) Foreign Application Priority Data

Jun. 30, 2023  (KR) .................... 10-2023-0084861

(51) Int. Cl.
| | | |
|---|---|---|
| H02K 16/02 | (2006.01) | |
| H02K 1/18 | (2006.01) | |
| H02K 7/116 | (2006.01) | |
| H02K 11/02 | (2016.01) | |

(52) U.S. Cl.
CPC ............ H02K 16/02 (2013.01); H02K 1/18 (2013.01); H02K 7/116 (2013.01); H02K 11/02 (2013.01)

(58) Field of Classification Search
CPC .......... H02K 16/02; H02K 1/18; H02K 7/116; H02K 11/02
USPC .................................... 310/114, 266
See application file for complete search history.

(56) References Cited

U.S. PATENT DOCUMENTS

2004/0232779 A1* 11/2004 Arimitsu ................ H02K 1/18
                                                      310/43

FOREIGN PATENT DOCUMENTS

| CN | 108448849 A | * 8/2018 | ............ H02K 16/02 |
| JP | 2004336915 A | * 11/2004 | |
| KR | 20210085057 A | 7/2021 | |

* cited by examiner

*Primary Examiner* — Jose A Gonzalez Quinones
(74) *Attorney, Agent, or Firm* — Lempia Summerfield Katz LLC (57) ABSTRACT

A dual rotor motor includes: an inner rotor and an outer rotor disposed one after the other in a radial direction; a stator disposed between the inner rotor and the outer rotor; and a plurality of eccentric cores provided to alter a magnetic path connection state of the stator by rotating around a rotation axis eccentric to a center of the stator.

16 Claims, 7 Drawing Sheets

DUAL ROTOR MOTOR

CROSS REFERENCE TO RELATED APPLICATION

The present application claims priority to Korean Patent Application No. 10-2023-0084861, filed Jun. 30, 2023, the entire contents of which are incorporated herein for all purposes by this reference.

BACKGROUND

Field of the Disclosure

The disclosure relates to a structure of a dual rotor motor.

Description of the Related Art

A dual rotor motor refers to a motor with a rotor disposed on both the inner and outer circumferential sides of a stator. An inner rotor on the inner circumferential side of the stator and an outer rotor on the outer circumferential side of the stator are configured to rotate independently of each other.

Therefore, the stator for driving the inner rotor and the outer rotor independently of each other includes slots on the inner and outer circumferential surfaces thereof. Coils are wound through the slots, respectively.

The subject matter described as the related art is merely intended to aid in understanding the background of the disclosure. The subject matter should not be accepted as recognition of the prior art that has already been known to a person of ordinary skill in the art.

SUMMARY

An aspect of the disclosure is to provide a dual rotor motor of which a magnetic path connection state is altered to decrease reluctance and increase inductance when an inner rotor and an outer rotor are rotated at the same speed, thereby improving the torque density of the motor.

According to an embodiment of the disclosure, a dual rotor motor includes: an inner rotor and an outer rotor disposed one after the other in a radial direction; a stator disposed between the inner rotor and the outer rotor; and a plurality of eccentric cores provided to alter a magnetic path connection state of the stator by rotating around a rotation axis eccentric to a center of the stator.

The stator may include inner teeth protruding toward the inner rotor and outer teeth protruding toward the outer rotor. The inner and outer teeth are arranged along the radial direction of the stator. The eccentric cores may be disposed between the inner teeth and the outer teeth.

The plurality of eccentric cores may be arranged between the inner teeth and the outer teeth along a circumferential direction of the stator.

The eccentric core may be formed by stacking a plurality of oriented steel sheets. The plurality of eccentric cores may be installed so that stacking directions of the oriented steel sheets can have the same phase with respect to the center of the stator.

The plurality of eccentric cores may be connected to a driving mechanism for simultaneously rotating the plurality of eccentric cores. Thus, the stacking directions of the oriented steel sheets in the plurality of eccentric cores can maintain the same phase.

The driving mechanism may include a plurality of pinions concentrically provided in the plurality of eccentric cores, respectively; a ring gear engaging with the plurality of pinions; and a driving actuator driving the ring gear to rotate.

The plurality of pinions may be installed with rotation shafts to be supported on a carrier concentrically provided inside the ring gear and the carrier may be fixed with respect to the stator.

The driving mechanism may be configured to align the stacking direction of the oriented steel sheets in the eccentric core perpendicularly to the radial direction of the stator. Thus, the eccentric cores can connect the magnetic path between the inner teeth and the outer teeth aligned along the radial direction of the stator when the inner rotor and the outer rotor are rotated at the same speed.

The driving mechanism may be configured to align the stacking direction of the oriented steel sheets in the eccentric core parallel to the radial direction of the stator. Thus, the eccentric cores can interrupt the magnetic path between the inner teeth and the outer teeth aligned along the radial direction of the stator when the inner rotor and the outer rotor are rotated independently of each other.

The eccentric core may be shaped like a cylinder to be rotatably inserted in the stator in parallel along a rotation axial direction of the inner rotor and the outer rotor.

According to another embodiment of the disclosure, a dual rotor motor includes an inner rotor, an outer rotor, and a stator positioned between the inner rotor and the outer rotor. The stator includes a plurality of inner teeth protruding toward the inner rotor and a plurality of outer teeth protruding toward the outer rotor. The inner and outer teeth are aligned with each other in a radial direction. The dual rotor motor also includes a plurality of coils respectively wound around inner slots formed between the inner teeth and around outer slot formed between the outer teeth. The dual rotor motor also includes a plurality of eccentric cores disposed to be individually rotatable between the inner teeth and the outer teeth of the stator and between the inner slot and the outer slot along a circumferential direction of the stator. The dual rotor motor also includes a driving mechanism provided to interlock the plurality of eccentric cores.

The eccentric core may be formed by stacking a plurality of oriented steel sheets in one direction. A stacking direction of the oriented steel sheets may be perpendicular to a rotation axis of the inner rotor and the outer rotor.

The plurality of eccentric cores arranged in the stator may be installed so that the stacking directions of the oriented steel sheets can have the same phase with respect to a center of the stator.

The driving mechanism may be configured to align the stacking direction of the oriented steel sheets of the eccentric core perpendicularly to the radial direction of the stator. Thus, the eccentric cores can connect a magnetic path between the inner teeth and the outer teeth aligned along the radial direction of the stator when the inner rotor and the outer rotor are rotated at the same speed.

The driving mechanism may be configured to align the stacking direction of the oriented steel sheets of the eccentric core parallel to the radial direction of the stator. Thus, the eccentric cores can interrupt the magnetic path between the inner teeth and the outer teeth aligned along the radial direction of the stator when the inner rotor and the outer rotor are rotated independently of each other.

The driving mechanism may include: a plurality of pinions concentrically provided in the plurality of eccentric cores, respectively; a ring gear engaging with the plurality of pinions; and a driving actuator driving the ring gear to rotate.

A carrier may be fixed to the stator and rotation shafts of the plurality of pinions may be rotatably supported in the carrier.

According to the disclosure, a dual rotor motor has a magnetic path connection state altered to decrease reluctance and increase inductance when an inner rotor and an outer rotor are rotated at the same speed, thereby improving the torque density of the motor.

BRIEF DESCRIPTION OF THE DRAWINGS

In order that the disclosure may be well understood, embodiments are described in various forms, given by way of example, reference being made to the accompanying drawings, in which.

DETAILED DESCRIPTION

Hereinafter, embodiments of the disclosure are described in detail with reference to the accompanying drawings, in which the same or similar elements are denoted by the same reference numerals even though they are depicted in different drawings and redundant descriptions thereof have been omitted.

Suffixes "module" and "unit" put after elements in the following description are for ease of description. These suffixes do not have meaning or functions discriminated from each other.

In terms of describing embodiments of the disclosure, detailed descriptions of the related art have been omitted where the subject matter of embodiments of the disclosure would have been unclear. In addition, the accompanying drawings are provided only for a better understanding of embodiments of the disclosure and are not intended to limit technical ideas of the disclosure. Therefore, it should be understood that the accompanying drawings include all modifications, equivalents, and substitutions within the scope and spirit of the disclosure.

Terms such as "first" and "second" may be used to describe various components, but the components should not be limited by the above terms. In addition, the above terms are used only for the purpose of distinguishing one component from another.

When it is described that one component is "connected" or "joined" to another component, it should be understood that the one component may be directly connected or joined to another component, but additional components may be present therebetween. However, when one component is described as being "directly connected," or "directly coupled" to another component, it should be understood that additional components are not disposed between the one component and another component.

Unless the context clearly dictates otherwise, singular forms include plural forms as well.

In the disclosure, it should be understood that the terms "include", "comprise", or "have" and variations thereof indicate that a feature, a number, a step, an operation, an element, a part, or the combination thereof described in embodiments is present. Such terms do not preclude a possibility of the presence or addition of one or more other features, numbers, steps, operations, elements, parts or combinations thereof, in advance.

When a component, device, element, or the like of the present disclosure is described as having a purpose or performing an operation, function, or the like, the component, device, or element should be considered herein as being "configured to" meet that purpose or to perform that operation or function.

Referring to FIGS. 1-7, a dual rotor motor according to an embodiment of the disclosure includes: an inner rotor IR and an outer rotor OR disposed one after the other in a radial direction; a stator ST disposed between the inner rotor IR and the outer rotor OR; and a plurality of eccentric cores EC provided to alter a magnetic path connection state of the stator ST by rotating around a rotation axis eccentric to the center of the stator ST.

For reference, the radial direction refers to a radial direction relative to the rotation axis of the motor.

Figure 1:
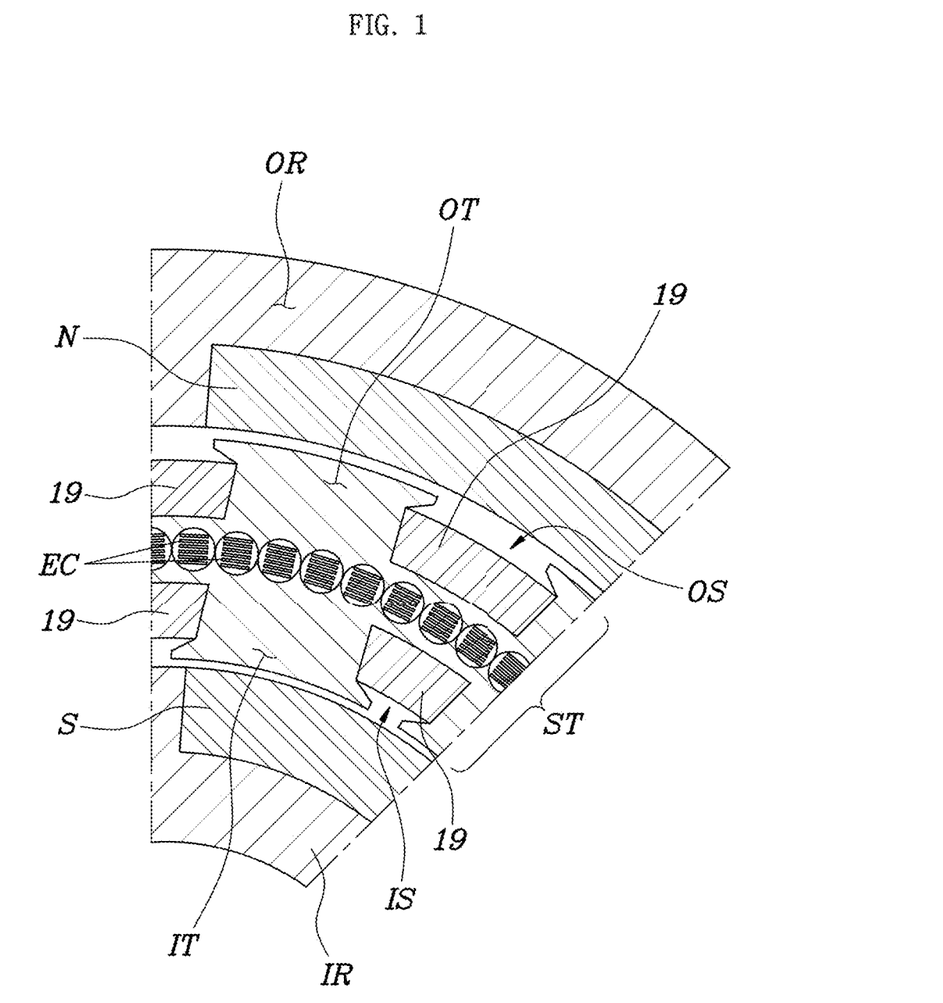
FIG. 1 illustrates a structure of a dual rotor motor according to the disclosure.
Figure 2:
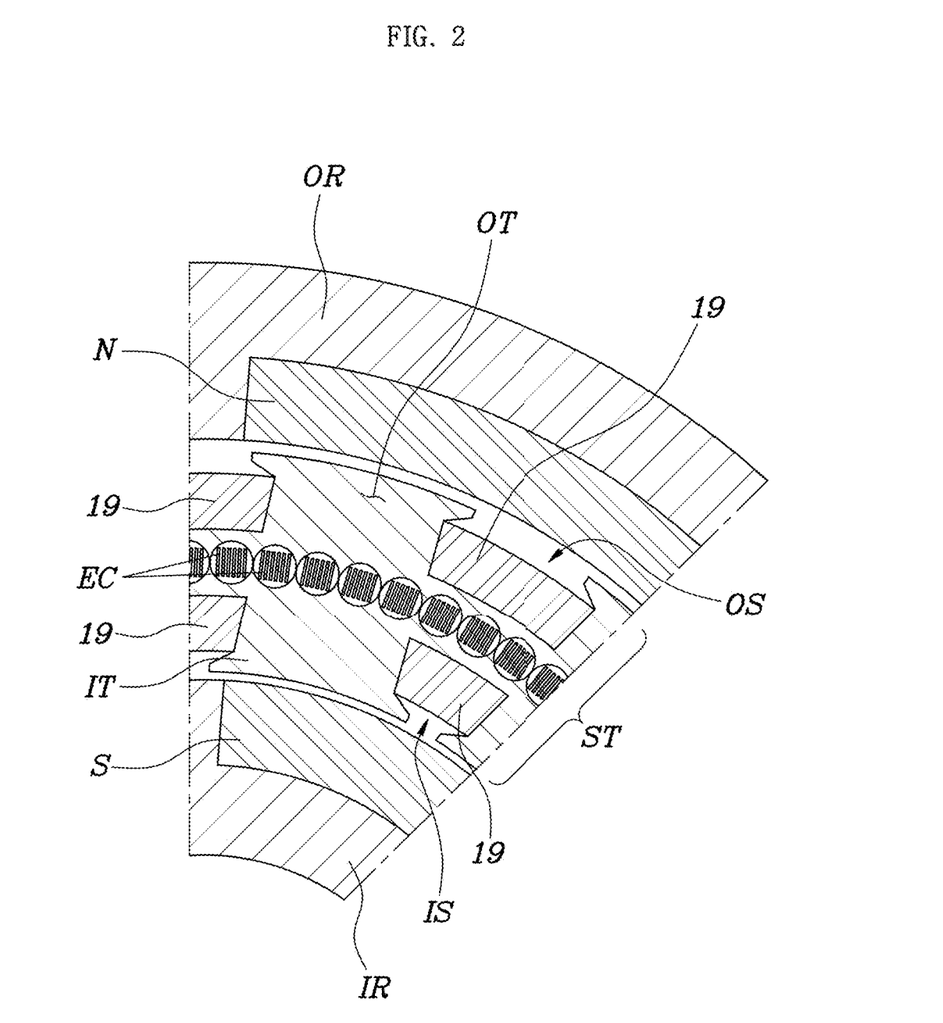
FIG. 2 illustrates an eccentric core rotated from the state of FIG. 1.

The eccentric core EC is provided to interrupt a magnetic path between the outer and inner sides of the stator ST when the inner rotor IR and the outer rotor OR are rotated independently of each other. The magnetic path is connected between the outer and inner sides of the stator ST when the inner rotor IR and the outer rotor OR are rotated at the same speed.

In other words, according to the disclosure, the magnetic path connection state between the inner and outer sides of the stator ST is altered by the eccentric core EC. Thus, the magnetic path formed between the stator ST and the outer rotor OR on the outer side of the stator ST and the magnetic path formed between the stator ST and the inner rotor IR on the inner side of the stator ST can be interrupted to be formed independently of each other when the inner rotor IR and the outer rotor OR are rotated independently of each other. However, the magnetic paths on the inner and outer sides of the stator ST are connected when the inner rotor IR and the outer rotor OR are rotated at the same speed. The overall length of the magnetic path formed between the stator ST and the inner and outer rotors IR and OR is thereby shortened and the reluctance is reduced to improve the torque density of the motor.

For reference, permanent magnets are provided in the outer rotor OR and the inner rotor IR, and denoted by 'N' and 'S,' which show the two magnetic poles of the permanent magnet, in the accompanying drawings, respectively.

The stator ST includes inner teeth IT protruding toward the inner rotor IR and outer teeth OT protruding toward the outer rotor OR, which are arranged along the radial direction. The eccentric cores EC are disposed between the inner teeth IT and the outer teeth OT.

In other words, the plurality of eccentric cores EC is arranged along a circumferential direction of the stator ST between the inner teeth IT and the outer teeth or, thereby forming a circle.

Figure 5:
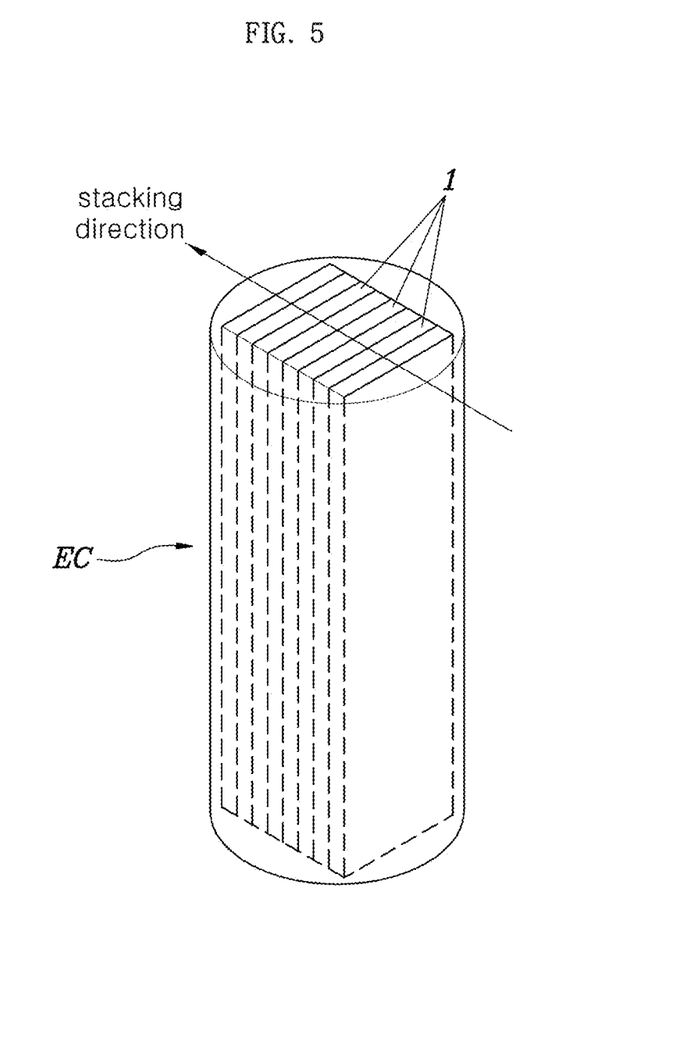
FIG. 5 illustrates the eccentric core of FIG. 1.

The eccentric core EC is formed by stacking a plurality of oriented steel sheets 1. The plurality of eccentric cores EC is installed so that the stacking directions of the oriented steel sheets 1 can have the same phase with respect to the center of the stator ST.

The oriented steel sheet 1 may include a silicon steel sheet or the like and may refer to a steel sheet that has good magnetic properties in a specific direction and poor magnetic properties in a direction perpendicular to the specific orientation.

In other words, as shown in FIG. 5, the plurality of oriented steel sheets 1 stacked in one direction has good magnetic properties in a direction parallel to the surface of the oriented steel sheet 1 (i.e., a direction perpendicular to the stacking direction), but has poor magnetic properties in a direction parallel to the stacking direction.

Here, when the plurality of eccentric cores EC is installed so that the stacking directions of the oriented steel sheets 1 can have the same phase with respect to the center of the stator ST, it means that angles formed between straight lines connecting the center of the stator ST to the centers of the eccentric cores EC and the stacking directions of the oriented steel sheets 1 of those eccentric cores EC are all the same.

For example, FIG. 1 shows that the angles formed between the straight lines connecting the center of the stator ST to the centers of the eccentric cores EC and the stacking directions of the oriented steel sheets 1 of those eccentric cores EC are all equal to 0°. FIG. 2 shows that the angles are all equal to 90°.

Figure 6:
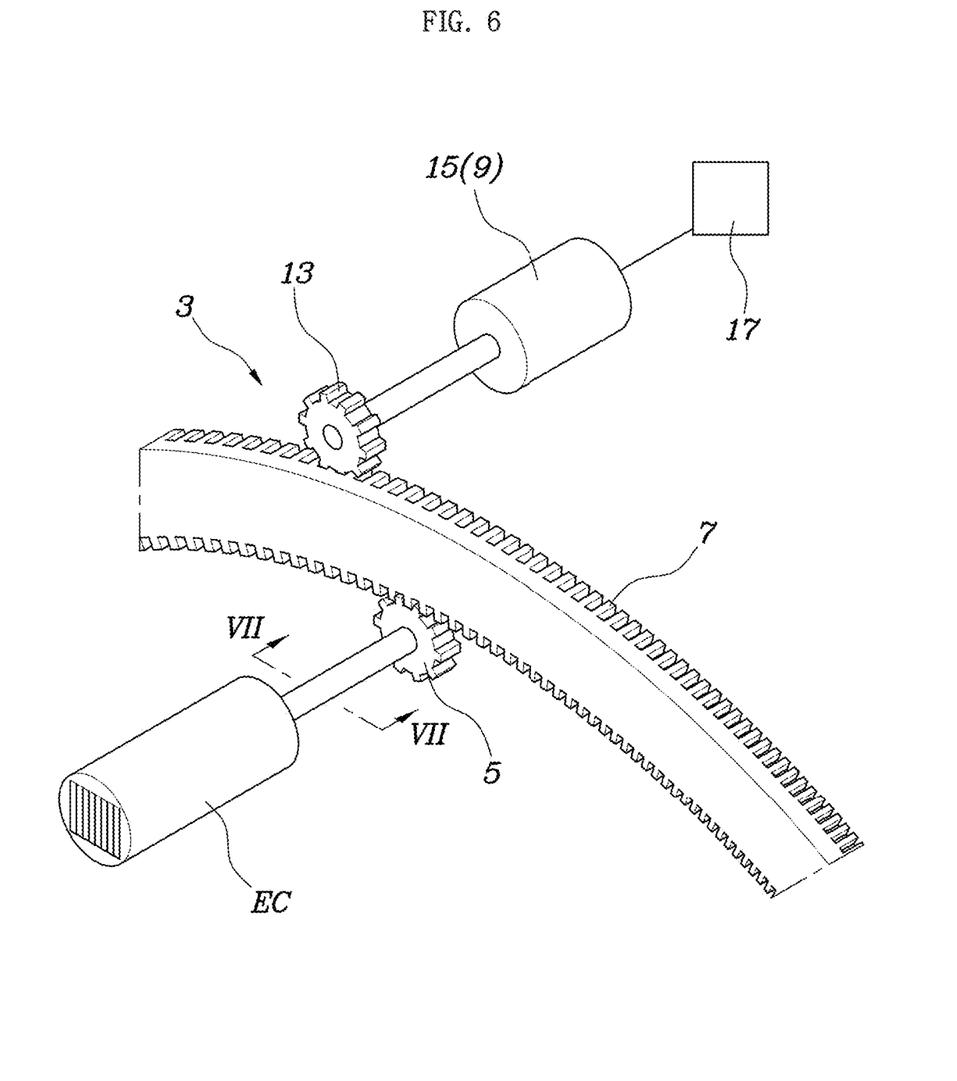
FIG. 6 illustrates a structure of a driving mechanism for actuating the eccentric core of FIGS. 1 and 5.

The plurality of eccentric cores EC is connected to a driving mechanism 3 for simultaneously rotating the plurality of eccentric cores EC. Thus, the stacking directions of the oriented steel sheets 1 in the plurality of eccentric cores EC can maintain the same phase.

Figure 7:
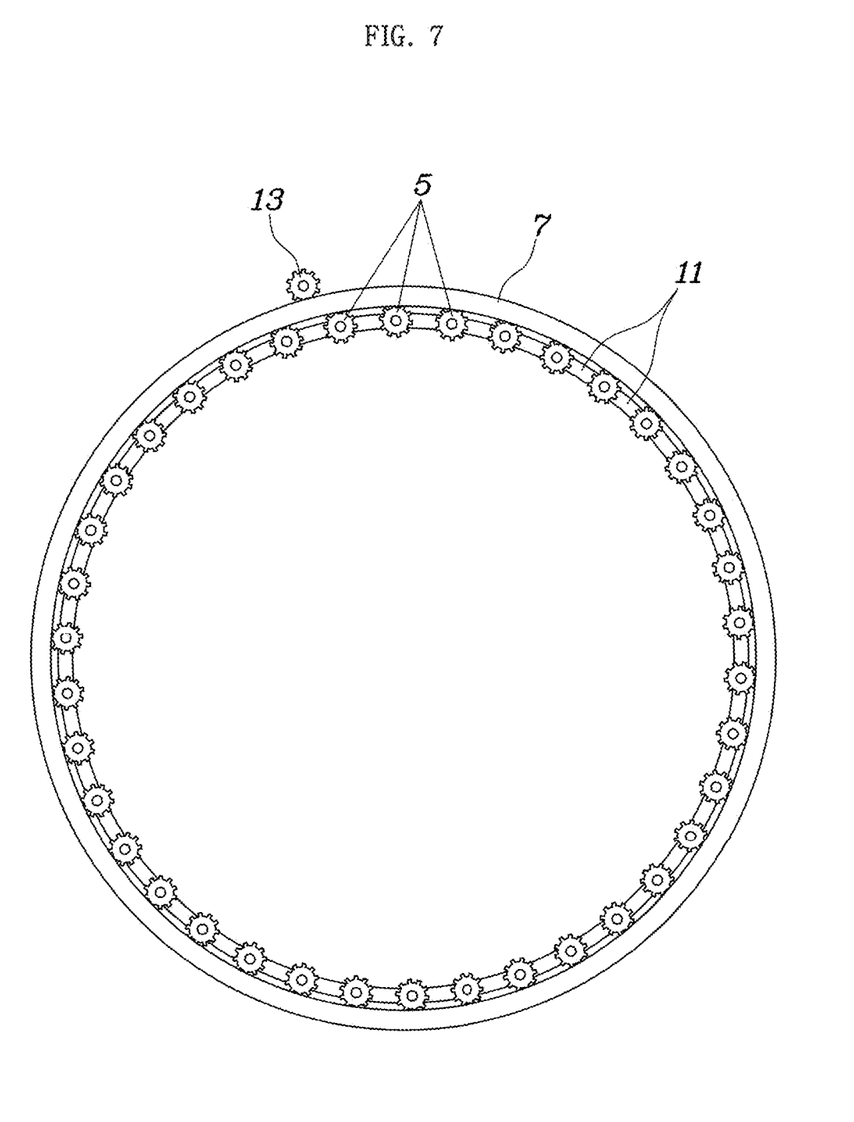
FIG. 7 illustrates a cross-section taken along line VII-VII of the structure of FIG. 6.

The driving mechanism 3 includes: a plurality of pinions 5 concentrically provided in the plurality of eccentric cores EC, respectively; a ring gear 7 engaging with the plurality of pinions 5; and a driving actuator 9 driving the ring gear 7 to rotate.

Therefore, when the driving actuator 9 drives the ring gear 7 to rotate, the pinions 5 engaging with the ring gear 7 are also rotated together. This allows the eccentric cores EC to rotate with respect to the stator ST.

The pinions 5 may be installed with rotation shafts to be supported on a carrier 11 concentrically provided inside the ring gear 7. The carrier 11 is fixed with respect to the stator ST, thereby more firmly supporting the pinions 5.

Figure 4:
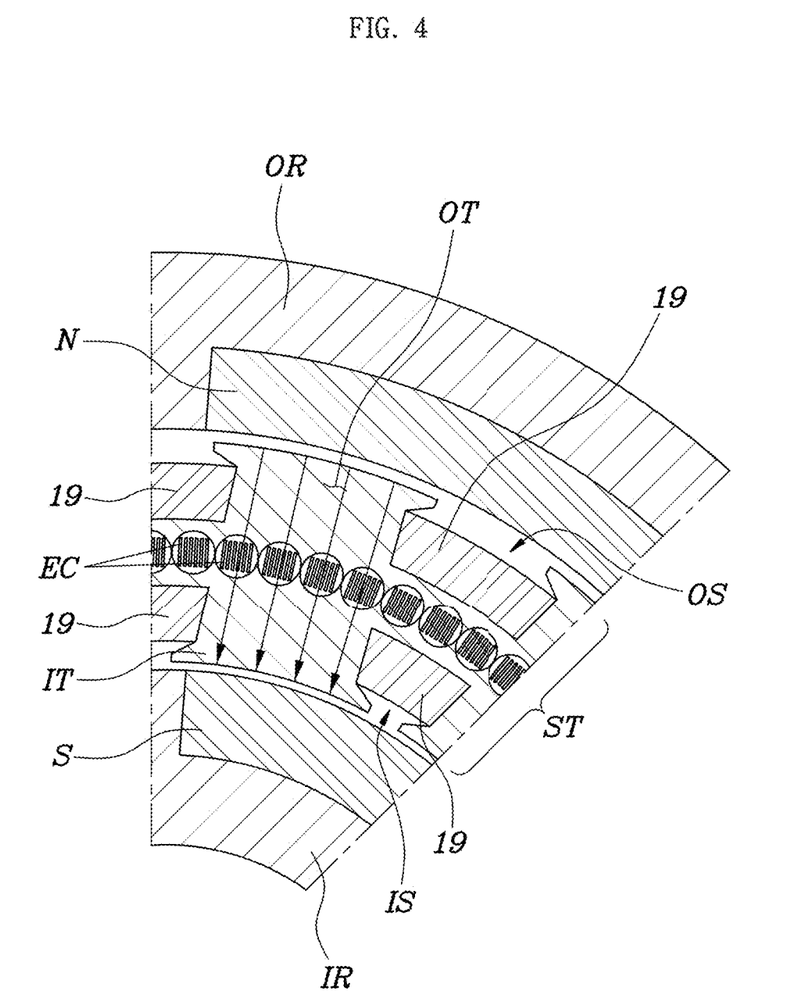
FIG. 4 illustrates a magnetic path connected between the outer teeth and the inner teeth in the dual rotor motor of FIG. 2.

The driving mechanism 3 is configured to align the stacking direction of the oriented steel sheets 1 in the eccentric core EC perpendicularly to the radial direction of the stator ST. Thus, the magnetic path between the inner teeth IT and the outer teeth OT aligned along the radial direction of the stator ST can be connected by the eccentric corer EC when the inner rotor IR and the outer rotor OR are rotated at the same speed.

In other words, the driving actuator 9 of the driving mechanism 3 includes a control motor 15 to rotate a driving gear 13 engaging with the ring gear 7, and the control motor 15 is controlled by a controller 17. When the controller 17 controls the inner rotor IR and the outer rotor OR to rotate at the same speed, the control motor 15 actuates the ring gear 7 to align the plurality of eccentric cores EC as shown in FIG. 4. This allows the eccentric cores EC to connect the magnetic path between the inner teeth IT and the outer teeth or.

In this way, the overall length of the magnetic path connecting the inner teeth IT and the outer teeth OT in a lump becomes shorter. This decreases the reluctance and ultimately improves the torque density of the motor compared to the length when the magnetic path formed between the stator ST and the inner rotor IR and the magnetic path formed between the stator ST and the outer rotor OR form closed magnetic paths independently of each other.

Figure 3:
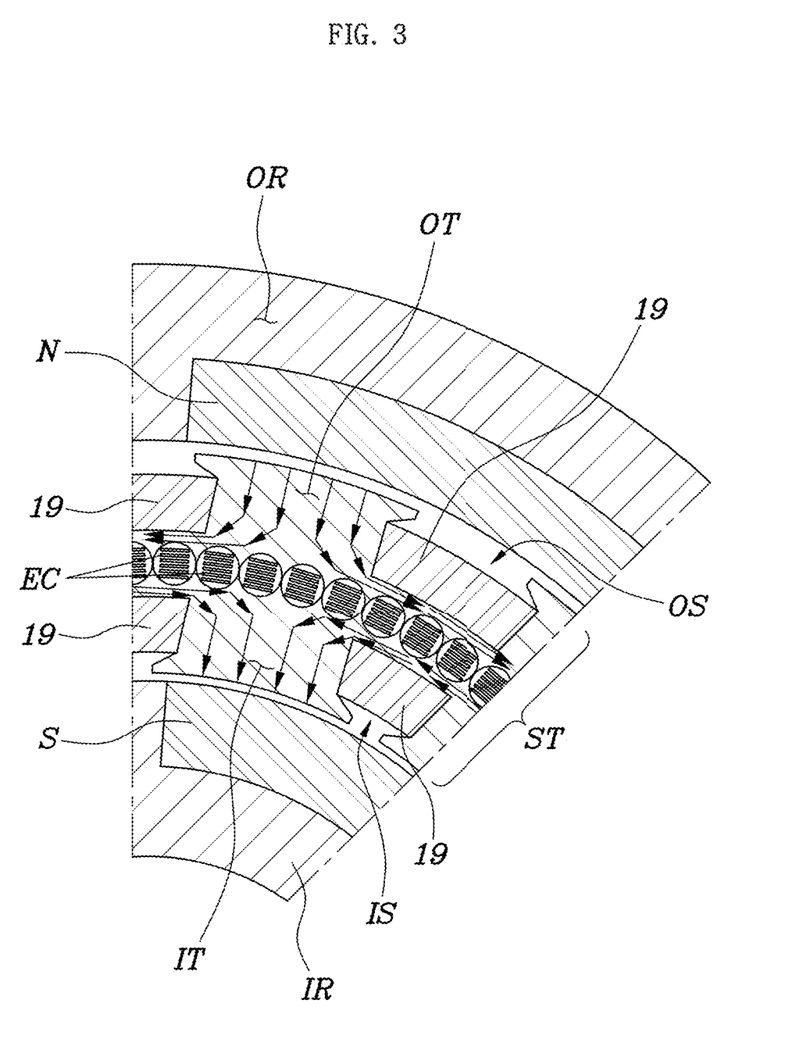
FIG. 3 illustrates a magnetic path interrupted between outer teeth and inner teeth by an eccentric core in the dual rotor motor of FIG. 1.

The driving mechanism 3 is configured to align the stacking direction of the oriented steel sheets 1 of the eccentric core EC parallel to the radial direction of the stator ST. Thus, the eccentric cores EC can interrupt the magnetic path between the inner teeth IT and the outer teeth OT aligned along the radial direction of the stator ST when the inner rotor IR and the outer rotor OR are rotated independently of each other.

In other words, the controller 17 controls the control motor 15 to align the plurality of eccentric cores EC as shown in FIG. 3. This allows the eccentric cores EC to interrupt the magnetic path between the inner teeth IT and the outer teeth OT.

When the magnetic path between the inner teeth IT and the outer teeth OT is interrupted by the eccentric cores EC as described above, the inner rotor IR and the outer rotor OR are reliably driven independently of each other. This makes it easier to control the inner rotor IR and the outer rotor OR and improve control precision.

In this embodiment, the eccentric cores EC are provided even between an inner slot IS and an outer slot OS around which coils 19 of the stator ST are wound. Thus, the magnetic path between the inner slot IS and the outer slot OS is also interrupted by the eccentric cores EC when the magnetic path between the inner teeth IT and the outer teeth OT is interrupted by the eccentric cores EC as described above. The performance of controlling the outer rotor OR and the inner rotor IR independently of each other is thereby improved.

For reference, as shown in FIG. 5, the eccentric core EC may be shaped like a cylinder to be rotatably inserted in the stator ST in parallel along a rotation axial direction of the inner rotor IR and the outer rotor OR.

The foregoing dual rotor motor according to the disclosure may be described as follows.

The dual rotor motor according to the disclosure may include the inner rotor IR, the outer rotor OR, and the stator ST positioned between the inner rotor IR and the outer rotor OR. The stator ST may include the plurality of inner teeth IT protruding toward the inner rotor IR and the plurality of outer teeth OT protruding toward the outer rotor OR, with the inner and outer teeth aligned with each other in the radial direction. The dual rotor motor may also include the plurality of coils 19 respectively wound around the inner slots IS formed between the inner teeth IT and around the outer slot OS formed between the outer teeth OT. The dual rotor motor may further include the plurality of eccentric cores EC disposed to be individually rotatable between the inner teeth IT and the outer teeth OT of the stator ST and between the inner slot IS and the outer slot OS along the circumferential direction of the stator ST. The dual rotor motor may also include the driving mechanism 3 provided to interlock the plurality of eccentric cores EC.

The eccentric core EC is formed by stacking the plurality of oriented steel sheets 1 in one direction. The stacking direction of the oriented steel sheets 1 is in a direction perpendicular to the rotation axis of the inner rotor IR and the outer rotor OR.

The plurality of eccentric cores EC arranged in the stator ST are installed so that the stacking directions of the oriented steel sheets 1 can have the same phase with respect to the center of the stator ST.

The driving mechanism 3 is configured to align the stacking direction of the oriented steel sheets 1 of the eccentric core EC perpendicularly to the radial direction of the stator ST. Thus, the eccentric cores EC can connect the magnetic path between the inner teeth IT and the outer teeth OT aligned along the radial direction of the stator ST when the inner rotor IR and the outer rotor OR are rotated at the same speed.

The driving mechanism 3 is configured to align the stacking direction of the oriented steel sheets 1 of the eccentric core EC parallel to the radial direction of the stator ST. Thus, the eccentric cores EC can interrupt the magnetic path between the inner teeth IT and the outer teeth OT aligned along the radial direction of the stator ST when the inner rotor IR and the outer rotor OR are rotated independently of each other.

The driving mechanism 3 includes the pinions 5 concentrically provided in the plurality of eccentric cores EC, respectively, the ring gear 7 engaging with the plurality of pinions 5, and the driving actuator 9 driving the ring gear 7 to rotate.

The carrier 11 is fixed to the stator ST and the rotation shafts of the pinions 5 may be rotatably supported in the carrier 11.

Although specific embodiments of the disclosure have been illustrated and described as above, various modifications and changes can be made by a person of ordinary skill in the art without departing from the scope of technical ideas defined by the appended claims.

What is claimed is:

1. A dual rotor motor comprising:
   an inner rotor and an outer rotor disposed one after the other in a radial direction;
   a stator disposed between the inner rotor and the outer rotor; and
   a plurality of eccentric cores provided to alter a magnetic path connection state of the stator by rotating around a rotation axis eccentric to a center of the stator,
   wherein the stator comprises inner teeth protruding toward the inner rotor and outer teeth protruding toward the outer rotor, the inner teeth and outer teeth being arranged along the radial direction; and
   at least some of the plurality of eccentric cores are disposed on a radial line extending between each of the inner teeth and the outer teeth.

2. The dual rotor motor of claim 1, wherein the plurality of eccentric cores is arranged between the inner teeth and the outer teeth along a circumferential direction of the stator.

3. The dual rotor motor of claim 2, wherein:
   each eccentric core of the plurality of eccentric cores has a stack of a plurality of oriented steel sheets; and
   the plurality of eccentric cores is installed so that stacking directions of the plurality of oriented steel sheets can have the same phase with respect to the center of the stator.

4. The dual rotor motor of claim 3, wherein the plurality of eccentric cores is connected to a driving mechanism for simultaneously rotating the plurality of eccentric cores so that the stacking directions of the plurality of oriented steel sheets in the plurality of eccentric cores can maintain the same phase.

5. The dual rotor motor of claim 4, wherein the driving mechanism comprises:
   a plurality of pinions concentrically provided in the plurality of eccentric cores, respectively;
   a ring gear engaging with the plurality of pinions; and
   a driving actuator driving the ring gear to rotate.

6. The dual rotor motor of claim 5, wherein:
   the plurality of pinions is installed with rotation shafts to be supported on a carrier concentrically provided inside the ring gear; and
   the carrier is fixed with respect to the stator.

7. The dual rotor motor of claim 4, wherein the driving mechanism is configured to align the stacking direction of the plurality of oriented steel sheets in each eccentric core perpendicularly to the radial direction of the stator so that the plurality of eccentric cores can connect the magnetic path between the inner teeth and the outer teeth aligned along the radial direction of the stator upon the inner rotor and the outer rotor being rotated at the same speed.

8. The dual rotor motor of claim 4, wherein the driving mechanism is configured to align the stacking direction of the plurality of oriented steel sheets in each eccentric core parallel to the radial direction of the stator so that the plurality of eccentric cores can interrupt the magnetic path between the inner teeth and the outer teeth aligned along the radial direction of the stator upon the inner rotor and the outer rotor being rotated independently of each other.

9. The dual rotor motor of claim 4, wherein each eccentric core is shaped like a cylinder to be rotatably inserted in the stator in parallel along a rotation axial direction of the inner rotor and the outer rotor.

10. A dual rotor motor comprising:
    an inner rotor and an outer rotor;
    a stator positioned between the inner rotor and the outer rotor, the stator including a plurality of inner teeth protruding toward the inner rotor and a plurality of outer teeth protruding toward the outer rotor, wherein the plurality of inner teeth and the plurality of outer teeth are aligned with each other in a radial direction;
    a plurality of coils respectively wound around inner slots formed between the plurality of inner teeth and around outer slots formed between the plurality of outer teeth;
    a plurality of eccentric cores disposed to be individually rotatable between the plurality of inner teeth and the plurality of outer teeth of the stator; and
    a driving mechanism provided to interlock the plurality of eccentric cores,
    wherein at least some of the plurality of eccentric cores are disposed on a radial line extending between each of the inner teeth and the outer teeth.

11. The dual rotor motor of claim 10, wherein:
    each eccentric core of the plurality of eccentric cores has a plurality of oriented steel sheets stacked in one direction; and
    a stacking direction of the plurality of oriented steel sheets is perpendicular to a rotation axis of the inner rotor and the outer rotor.

12. The dual rotor motor of claim 11, wherein the plurality of eccentric cores arranged in the stator is installed so that the stacking directions of the plurality of oriented steel sheets can have the same phase with respect to a center of the stator.

13. The dual rotor motor of claim 12, wherein the driving mechanism is configured to align the stacking direction of the plurality of oriented steel sheets of each eccentric core perpendicularly to the radial direction of the stator so that the plurality of eccentric cores can connect a magnetic path between the plurality of inner teeth and the plurality of outer teeth aligned along the radial direction of the stator upon the inner rotor and the outer rotor being rotated at the same speed.

14. The dual rotor motor of claim 13, wherein the driving mechanism is configured to align the stacking direction of the plurality of oriented steel sheets of each eccentric core parallel to the radial direction of the stator so that the plurality of eccentric cores can interrupt the magnetic path between the plurality of inner teeth and the plurality of outer teeth aligned along the radial direction of the stator upon the inner rotor and the outer rotor being rotated independently of each other.

15. The dual rotor motor of claim 14, wherein the driving mechanism comprises:
   a plurality of pinions concentrically provided in the plurality of eccentric cores, respectively;
   a ring gear engaging with the plurality of pinions; and
   a driving actuator driving the ring gear to rotate.

16. The dual rotor motor of claim 15, wherein:
   a carrier is fixed to the stator; and
   rotation shafts of the plurality of pinions are rotatably supported in the carrier.

* * * * *